US008671190B2

(12) United States Patent  (10) Patent No.:  US 8,671,190 B2
Liyanage et al.  (45) Date of Patent:  Mar. 11, 2014

(54) MEASURING PAGE VIEWERSHIP IN A SOCIAL NETWORK

(75) Inventors: Janaka Liyanage, Mountain View, CA (US); Wenrui Zhao, Mountain View, CA (US); Louis Eisenberg, San Francisco, CA (US); Danilo Torres de Sa Resende, San Francisco, CA (US); Eric Michael Giovanola, Palo Alto, CA (US); David Gross-Baser, Mountain View, CA (US); Ami Vora, San Francisco, CA (US); Srikant Ramakrishna Ayyar, Mountain View, CA (US); Ajoy Joseph Frank, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/336,605

(22) Filed: Dec. 23, 2011

(65) Prior Publication Data

US 2013/0166725 A1  Jun. 27, 2013

(51) Int. Cl.
*G06F 15/173*  (2006.01)
(52) U.S. Cl.
USPC .......................................... 709/224; 709/223
(58) Field of Classification Search
USPC .................................................. 709/223–224
See application file for complete search history.

(56) References Cited

U.S. PATENT DOCUMENTS

| | | | |
|---|---|---|---|
| 8,151,194 B1 * | 4/2012 | Chan et al. ..................... | 715/716 |
| 8,380,801 B2 * | 2/2013 | Sherrets et al. ................ | 709/206 |
| 2011/0161987 A1 * | 6/2011 | Huang et al. ................... | 719/318 |
| 2011/0231240 A1 * | 9/2011 | Schoen et al. ............. | 705/14.41 |
| 2011/0238754 A1 * | 9/2011 | Dasilva et al. ................. | 709/204 |
| 2011/0276396 A1 * | 11/2011 | Rathod ....................... | 705/14.49 |
| 2012/0023534 A1 * | 1/2012 | Dasilva et al. ................. | 725/109 |
| 2012/0095976 A1 * | 4/2012 | Hebenthal et al. ............ | 707/706 |
| 2012/0130809 A1 * | 5/2012 | Tedjamulia et al. ........ | 705/14.53 |
| 2012/0265827 A9 * | 10/2012 | Hansson et al. ............... | 709/206 |
| 2012/0278475 A1 * | 11/2012 | Papakipos et al. ............ | 709/224 |
| 2012/0290399 A1 * | 11/2012 | England et al. ............ | 705/14.66 |
| 2013/0018730 A1 * | 1/2013 | Morris et al. ............... | 705/14.61 |
| 2013/0031088 A1 * | 1/2013 | Srikrishna et al. ............ | 707/722 |
| 2013/0085858 A1 * | 4/2013 | Sim et al. ................... | 705/14.58 |

\* cited by examiner

*Primary Examiner* — Moise Emmanuel
(74) *Attorney, Agent, or Firm* — Fenwick & West LLP

(57) ABSTRACT

A social networking system includes pages created by users for providing content related to topics of interest. An interaction engine captures data and maintains analytical information about how users interact with pages and posts. When a user takes an action such as liking a page or a post, the interaction engine updates the page's activity history to reflect the activity and information about the user who took the action. The interaction engine also measures the reach of pages and posts, by determining how and from where each user viewed the page and its contents. The interaction engine further tracks the community's interest in pages and posts by determining how many unique users create stories that include a page or its content. An insights module uses the data obtained by the interaction engine to synthesize graphical reports about page interactions and present the reports to page administrators.

20 Claims, 9 Drawing Sheets

Export Insights Data 🔒 700

Export data directly to Excel (.xls) or comma-separated text format (.csv). Choose either Page level data or Page post level data. You may select any date range, with a maximum of 1,000 posts at a time.

Select Data Type:
◉ Page level data
○ Post level data

Select Data Type:
◉ Excel (.xls)
○ Comma-separated values (.csv)

Select Data Range:

Start Time: 9/3/2011
End Time: 10/3/2011

Insight data is not available before July 16.

702
[Download] [Cancel]

*FIG. 7*

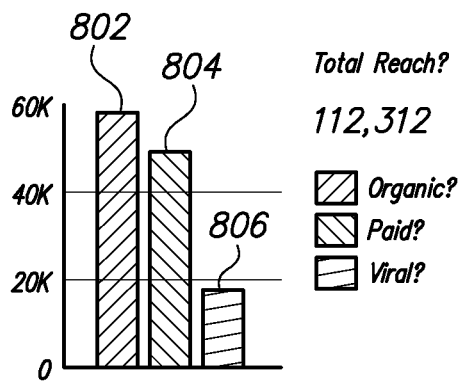

*FIG. 8*

MEASURING PAGE VIEWERSHIP IN A SOCIAL NETWORK

BACKGROUND

1. Field

The described invention relates generally to measuring viewership of a page in a social network.

2. Description of Related Art

Pages in a social network can be directed to various topics of interest, including celebrities; local or national businesses; fictional characters; political or ideological movements; or any of a variety of other topics. Pages are created by one or more users of the social network, who then become administrators of the page. Many pages are open to all users of the social network.

SUMMARY

A social networking system includes one or more pages created by users for providing content related to topics of interest. Pages may relate to a business, public figure, political movement, or other concept. These pages are different from user profile pages in that they are not specific to a particular user of the social networking system, but rather are specific to the particular entity or concept that is the subject of the page. Pages are maintained by the users of the social networking system that created the pages, known as administrators. Some or all users of the social networking system may post content to the pages, including links, photos, videos, questions, events, and comments. Users view content of the pages directly, by visiting the pages, or when particular posts on pages are republished by other users.

An interaction engine captures data and maintains analytical information about how users interact with pages and posts in the social networking system. Each time a user takes an action such as liking a page or a post on the page, the interaction engine updates the page's activity history to reflect the activity as well as information about the user who took the action, such as the user's age, gender, location, and language. The interaction engine also measures the reach of pages and posts, by determining how and from where each user viewed the page and its contents. The interaction engine further tracks the community's interest in pages and posts by determining how often stories are created by users that include a page or its content.

An insights module of the social networking engine uses the data obtained by the interaction engine and stored in the page activity history database to synthesize graphical reports about page interactions and present the reports to page administrators. This provides administrators with the ability to easily understand which page content is of greatest interest to users of specific demographics, and helps administrators tailor content to reach particular audiences.

BRIEF DESCRIPTION OF THE DRAWINGS

FIG. 7 illustrates a user interface for controlling the export of insights data in accordance with one embodiment.

FIG. 8 is an example of a graph illustrating reach of a post in accordance with one embodiment.

DETAILED DESCRIPTION

Each of a plurality of users of social networking system 100 has an account profile stored in accounts database 102. Each account profile has an associated account profile page, which provides a location within the social networking system 100 for other users to interact with the account holder. For example, both the user and other users may post comments, photographs, links and the like to the account holder's profile page.

In addition to profile pages associated with a user account profile, users can also create pages that relate to a business, public figure, political movement, or other concept. These pages are different from user profile pages in that they are not specific to a particular user of the social networking system 100, but rather are specific to the particular entity or concept that is the subject of the page. For example, users may create pages for their favorite local coffee shop; the latest recording artist sensation; or a non-profit organization. These pages may be created by fans of the particular topic, or may be created by users with a more particularized interest—for example, a national fast-food restaurant chain may establish a page dedicated to that brand. Throughout the remainder of this description, we refer to these non-user profile pages simply as "pages".

Users can post comments, pictures, links, videos, media, or other content on a page. Users can also add comments or endorse ("like") other posts on the page, and in addition can like the page itself. A page can also include text, comments, photos, advertisements, logos or trademarks, location information, product information, marketing materials, URL links, information about deals or promotions, other related products, or upcoming events, etc.

As noted, a user of the social networking system 100 creates one or more pages in the social networking system. The creator and other users that the creator may designate are known as administrators of the page. Administrators have the ability to modify content and settings, e.g., relating to the page's appearance, and in various embodiments have additional power to control how the page is used—for example, by regulating access to the page by certain users, posting to the page by none, some or all users, and the like. Administrators can also take actions within the social networking system on behalf of the page, for example by liking other pages.

Figure 1:
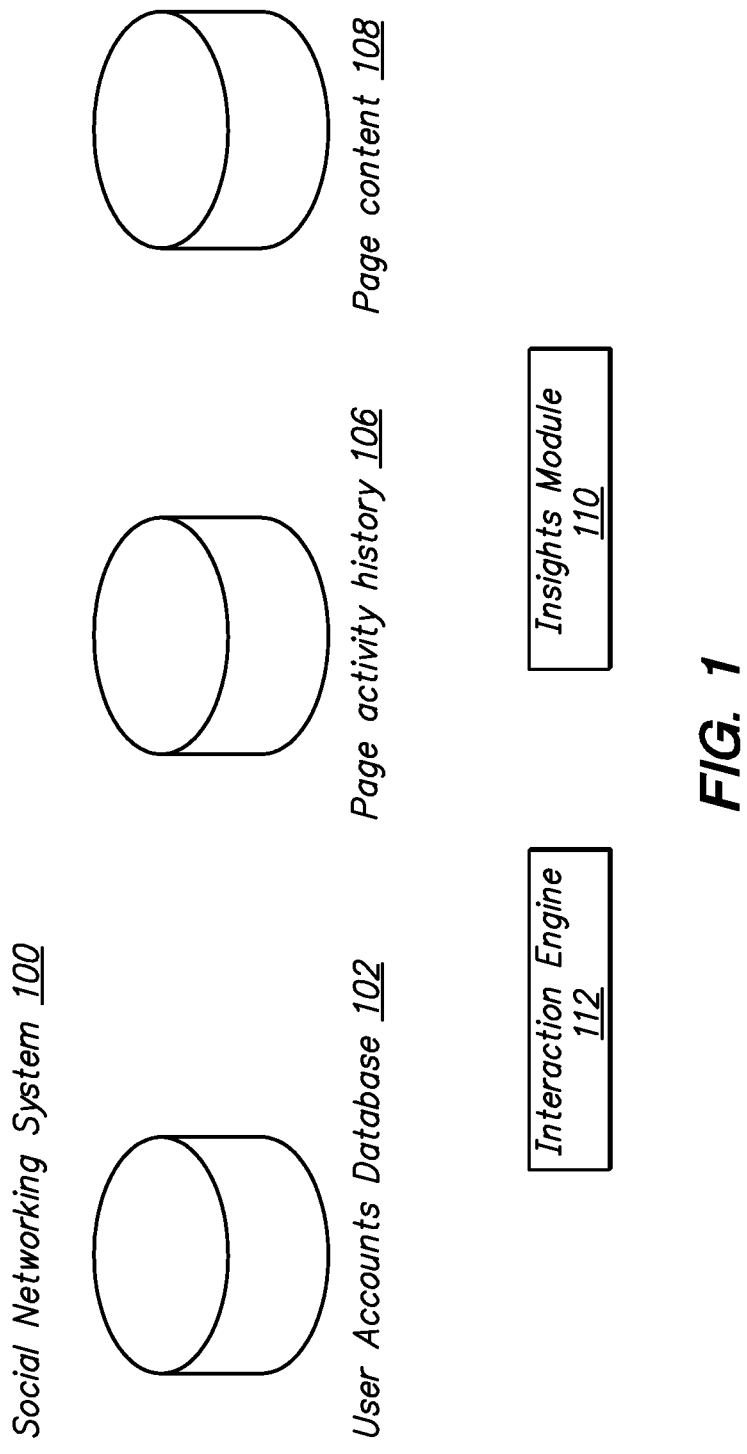
FIG. 1 is a block diagram of a social networking system in accordance with one embodiment.

FIG. 1 illustrates a social networking system 100 in accordance with one embodiment. Social networking system 100 is implemented using computer servers with access to a network such as the Internet. In addition to components known to those of skill in the art and found in a conventional social networking system (and therefore not described here, for the sake of clarity), social networking system 100 additionally includes a user accounts database 102, page content database 108, page activity history database 106, interaction engine 112, and insights module 110.

User accounts database 102 stores accounts for each user of the social networking system 100, including profile information. Profile information typically includes the name, location, age, and gender of each user, as well as interests, organizational affiliations, and the like. In addition, profile information for a user includes indicia of any pages for which the user is an administrator.

Page content database 108 stores page content and metadata for each page in social networking system 100. Page metadata includes indicia of the page's administrators, page layout, and access control policies, if any. Page content includes photos, links, objects, and posts contributed by page administrators or other users of social networking system 100.

Page activity history database 106 stores information about interactions with a page, such as likes received by a page or posts on a page, the reach of the page or posts on the page, and information about who is including the page or stories from the page in their own stories.

Interaction engine 112 receives information about the behavior of users with respect to pages and page content and updates page activity history 106 to reflect those interactions. Insights module 110 uses data from page activity history 106 to analyze page interactions and provide summary data to page administrators. The operation of each of these components is described further below.

As noted, users of social networking system 100 can view content on and otherwise interact with pages. One way users can interact with a page is to endorse or express an affinity for a page, also known as liking a page. When a user likes a page, the user's profile page is typically updated to reflect that the user likes the page, and that fact is also shown to friends of the user in their news feeds. This, in turn, causes an increase in the number of visitors to the page, leading to additional liking of the page. Administrators therefore tend to view likes of their page as one way to increase interest in their page across the social network.

Figure 2:
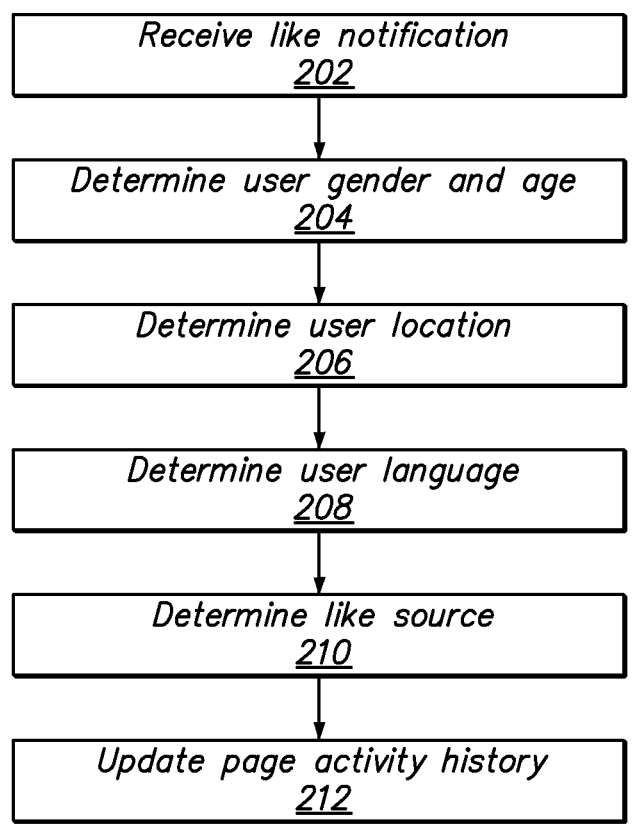
FIG. 2 is a flowchart illustrating a method for storing information about page likes in accordance with one embodiment.

Social networking system 100 enables page administrators to understand who likes their pages, and what the sources of the likes were. FIG. 2 is a flow chart illustrating how interaction engine 112 stores page like data in accordance with one embodiment. Interaction engine 112 initially receives 202 a notification that a user has liked a page. Next, interaction engine 112 determines 204 from user accounts database 102 the user's age and gender. From an IP address associated with the user when she liked the page, the user's likely location, including country and city, is determined 206. The user's language is determined 208, again by reference to the user accounts database. Finally, a like source is determined 210. The like source establishes where in the context of the social networking system (or outside of it) the user indicated that she liked the page. In one embodiment, possible like sources include the following:

On Page, News Feed, or Ticker: people who like the page on the page itself, or in a news feed or ticker story.

Ads and Sponsored Stories: people who liked an advertisement or a sponsored story pointing to the page.

Recommendations: people who liked the page based on a list of recommended pages provided to the user by the social networking system 100.

Mobile: people who liked the page using a mobile device.

Third party applications: people who liked the page via an application developed by a third party.

Page likes another page: other pages that have liked the page.

Timeline edit: people who added the page to their likes on their timeline or profile page.

Page browser: people who liked the page using a browsing feature of the social networking system to browse pages.

Like box or Like button: people who liked the page using a plugin on a site external to the social networking system 100.

Administrator registration: people added to the page as administrators.

Administrator invitation: people who liked the page after receiving an invitation to the page from an administrator.

After determining 210 the like source for the new like, interaction engine 112 then updates 212 the page's activity history in page activity history 106.

By tracking demographic information and like sources for each like and updating the page's activity history to reflect this information, social networking system 100 can then provide meaningful reporting data to page administrators about to whom their pages appeal, as described further below with respect to FIG. 11, FIG. 12, and FIG. 13.

Figure 3:
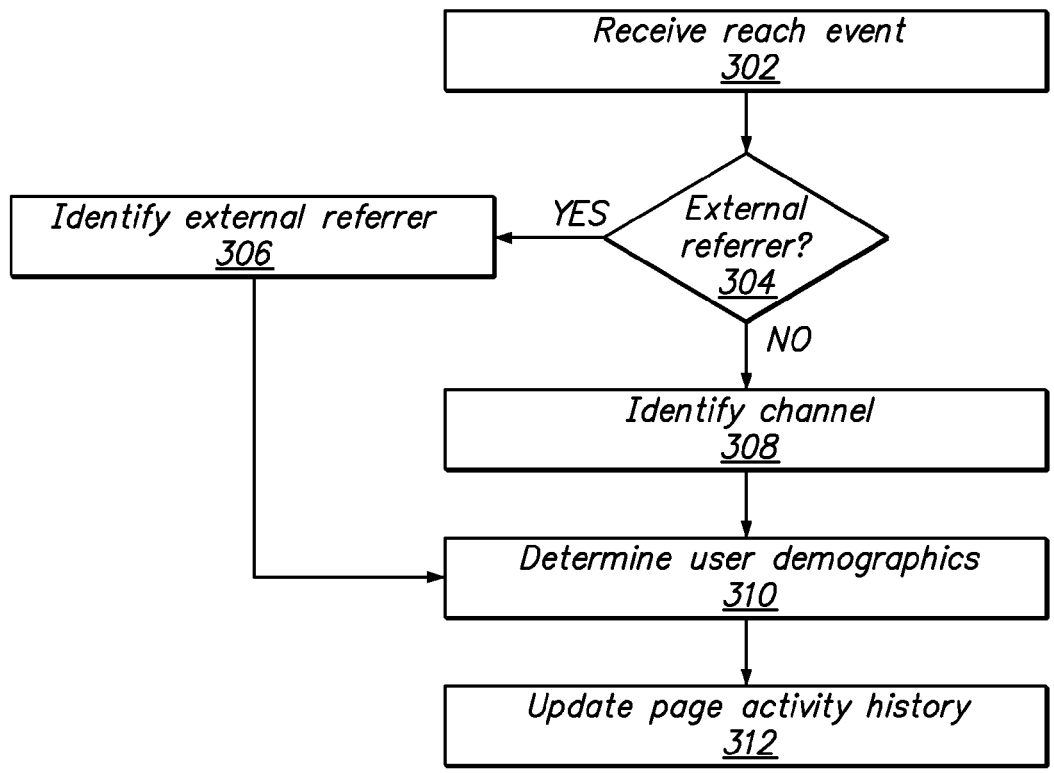
FIG. 3 is a flowchart illustrating a method for storing information about page reach in accordance with one embodiment.

Interaction engine 112 also enables tracking of a page's reach. A page is said to reach a user if the user sees any content associated with the page. FIG. 3 is a flowchart illustrating a method for identifying a page's reach in accordance with one embodiment. Interaction engine 112 receives 302 a notification that a reach event has occurred for a page. For example, a posting on the page may be displayed as part of the news feed of a user who likes the page, or may be shared by a user visiting the page, or the page may be visited by a user, etc. Once interaction engine 112 receives the reach event notification, interaction engine 112, it determines 304 whether the reach event is a visit to the page by a user referred from an external page, for example via a search engine or link on a third-party web site. If the event is a visit from an external referrer, interaction engine 112 identifies 306 the external referrer, using the HTTP Referrer header information, for example.

If the reach event is not an external page referral, then interaction engine identifies 308 a channel by which the page content reached the user. In one embodiment, interaction engine 112 determines whether the interaction occurred organically, through a paid channel, or through a viral channel. Interaction engine 112 classifies the interaction as organic if the user encountered the page content in the user's news feed, ticker, or on the page itself. The interaction is classified as through a paid channel if the user saw an ad or a sponsored story that pointed to the page. And the interaction is classified as viral if the user encountered the content via a story published by a friend.

Next, interaction engine 112 determines 310 the user's demographics, including age, gender, location and language as described above with respect to FIG. 2. Finally, interaction engine 112 updates 312 the page's activity history 106 to reflect the data determined about the reach event. In one embodiment, interaction engine 112 additionally determines which of multiple tabs on the page the reached content belongs to, and includes this information in the activity history 106.

Figure 4:
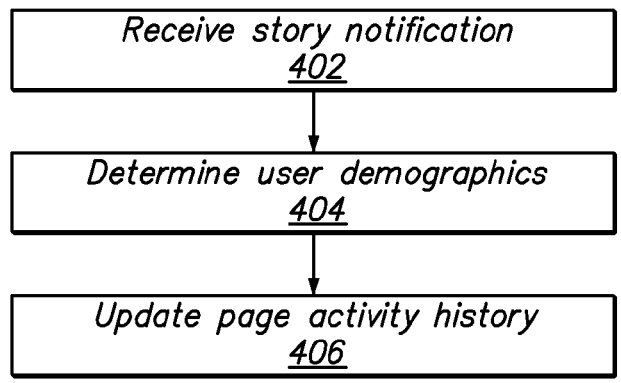
FIG. 4 is a flowchart illustrating a method for storing information about page stories in accordance with one embodiment.

Referring to FIG. 4, another interaction with pages measured by social networking system 100 is the creation of a story about the page. A story about a page is created in one embodiment to indicate that a user took one of the following actions:

Liked the page;
Liked, commented on, or shared a post made by the page;
Answered a question asked by the page;
Responded to an event hosted by the page;
Mentioned the page in a post;
Tagged the page in a photo; or
Checked in or recommended a place associated with the page Interaction engine 112 receives 402 a story notification triggered by a user engaging in one of the above activities. In response, interaction engine 112 determines 404 user demographics, including the user's age, gender, location, and language, as described above with respect to FIG. 2. Next, interaction engine 112 updates 406 the page activity history 106 to reflect the occurrence of the interaction.

In various embodiments, interaction engine 112 additionally tracks the reach, engagement, and interest in individual posts on a page, as well as with the page itself.

For example, interaction engine 112 in one embodiment tracks the total number of people who have seen each post on each page, and the channel by which the post reached the viewers, maintaining that information in updates page activity history 106.

In one embodiment, interaction engine 112 also tracks the number of people talking about, or creating a story about, each post on a page, as described above in the context of an entire page with respect to FIG. 4.

And in one embodiment interaction engine 112 tracks the number of engaged users for each post, which includes the number of unique people who have clicked anywhere on the post, including liking the post or otherwise creating a story about the post as described above with respect to FIG. 4 in the context of a page; clicking on a link within the post; clicking on a photo or a video; or on any other element of the post.

Interaction engine 112 also in one embodiment determines the virality of a post by determining the number of unique people who have created a story based on a post, as a fraction of the total number of people who have seen the post.

Presenting Viewership Information

Insights module 110 presents the information collected by interaction engine 112 and stored in page activity history 106 in a manner that allows page administrators to understand how a page is performing, learn which content is most interesting to particular audiences, and optimize the reach of the page to users of the social networking system 100.

Figure 5:
FIG. 5 is a screen shot illustrating an administrator's view of a page in accordance with one embodiment.

Referring to FIG. 5, in one embodiment an administrator's view of a page includes a control element 502 in a control region 500 of the page. Selection of control element 502 enables the administrator to interact directly with insights module 110.

Figure 6:
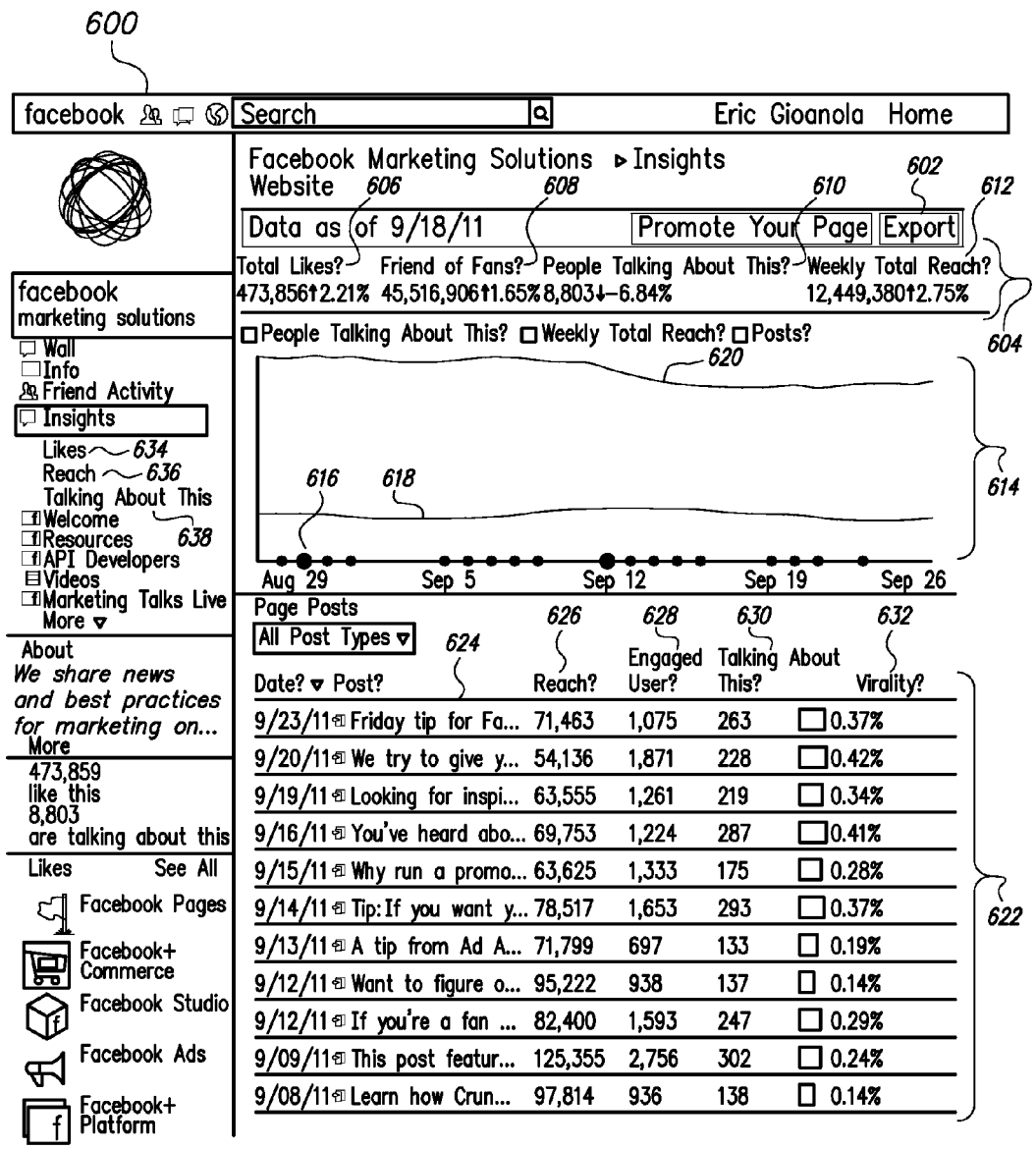
FIG. 6 illustrates an example of an insights overview page in accordance with one embodiment.

FIG. 6 illustrates an example of an insights overview page 600 in accordance with one embodiment. An administrator may select an export control element 602 to export insights data for review in another application, for example a spreadsheet application. FIG. 7 illustrates a user interface 700 for controlling the export of insights data. Using the user interface 700, the administrator can select a data range for which data should be exported, a file format for the data export, and the type of data to be exported—either page level data, for aggregate data about the page, or post level data for data on each of the posts made on a page. Selecting a control element such as the "Download" button 702 initiates the export function.

Returning to FIG. 6, insights page 600 includes a region 604 that provides an understanding of the page's overall performance. Insights module 110 populates insights page 600 and the following pages by reading data about each post and page, as appropriate, from page activity history 106. A "Total Likes" value 606 represents a number of users of social networking system 100 who have liked the page, through all like sources. Because friends of these fans represent a much larger set of consumers than fans alone and are much more likely than the average user to visit the page, a "Friends of Fans" value 608 describes to administrators how many friends within the social network are had by users who have indicated an affinity for the page. ("Friends" in the context of a social network indicates a relationship between two users of the network who have expressed a mutual affinity for each other, as understood by those of skill in the art.) The friends of fans value 608 is suggestive of a total number of people the page's content could potentially reach if each of its fans told all of their friends about the content.

The "People Talking About This" value 610 indicates how many users are actually talking about the page to their friends. In one embodiment, this metric includes the actions described above with respect to FIG. 4, as measured over a specified time period such as the previous 7 days. Note that in various embodiments, the time period is selectable by the user using a UI control element (not shown), or set by the implementer of the social networking system 100. A "Total Reach" value 612 describes a total number of unique people who have seen any content associated with the page within the particular time period.

In one embodiment, some of the above values are viewable by other members of the social network, even if they are not administrators of the page. For example, a total number of users who like a page, or a total number of mentions that a page has received may be visible to all users. In one embodiment, the administrators of the page are able to select which, if any, values are viewable by users other than page administrators.

Region 614 of insights page 600 includes a graph that illustrates the interplay between posts made on the page over time, people talking about the page, and total reach of the page. In the illustrated embodiment, insights module 110 displays indicators such as indicator 616 along a date axis to represent dates on which posts were made to the page. The size of the indicator in the illustrated case represents generally a number of posts made on that day—the larger the indicator, the greater the number of posts. Along the same date axis, a line 618 illustrates a number of people talking about the page (as described above with respect to value 610) on that date. Another line 620 represents the total reach for the page along the same date axis. In one embodiment, the total reach value, as described above, represents the total reach of the page over a period ending on the indicated date. In one embodiment, the period displayed by the graph is selectable by the administrator. For example, a control element (not shown) allows the administrator to choose to view data for the previous week, month, year, or custom dates.

Region 622 of insights page 600 lists a plurality of posts made by the page over the default or selected time period. Each row in the list in one embodiment includes a date of the post; an identifier 624 for the post, such as the first several characters of its text; the reach 626, or number of unique users who viewed the post; the number of engaged users 628, that is, the number of users who have clicked within the post as described above; the number of users who talked about the post 630, i.e. users who interacted with the post as described above with respect to value 610; and the virality of the post 632, as measured by the fraction of users viewing the post who have created a story about the post. Providing information at the per-post level enables administrators to recognize the characteristics of individual posts that are most likely to reach large audiences. In various embodiments, the listing of the posts is sortable according to any of the columns, for example by clicking on the desired column heading.

In one embodiment, by clicking on any of the reach 626, engaged users 628, talking about this 630, or virality 632 entries for a post, supporting data is presented. For example, FIG. 8 illustrates an example of a graph 800 presented in response to the user clicking on an item in the reach column 626. Graph 800 includes three columns, representing a number of users that the post reached organically 802, through a paid channel 804, or through a viral channel 806, respectively.

Figure 9:
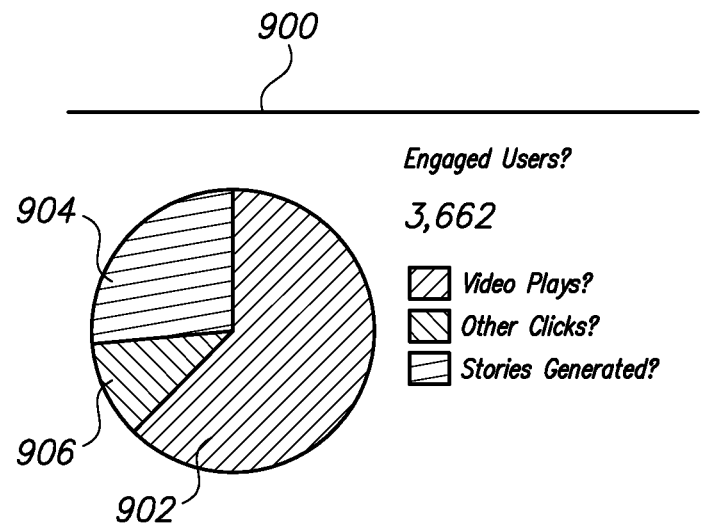
FIG. 9 is an example of a graph illustrating engagement with a post in accordance with one embodiment.

FIG. 9 illustrates an example of a graph 900 presented in response to the user clicking on an item in the engaged users column 628. As noted an engaged user is a user who has clicked anywhere within the post. The pie chart 900 illustrated in the example of FIG. 9 segments user engagement into three categories: video plays 902, stories generated 904 and other clicks 906. In various embodiments, categories may additionally include photo views, clicked links, likes, shares, comments, event RSVPs and questions answered.

Figure 10:
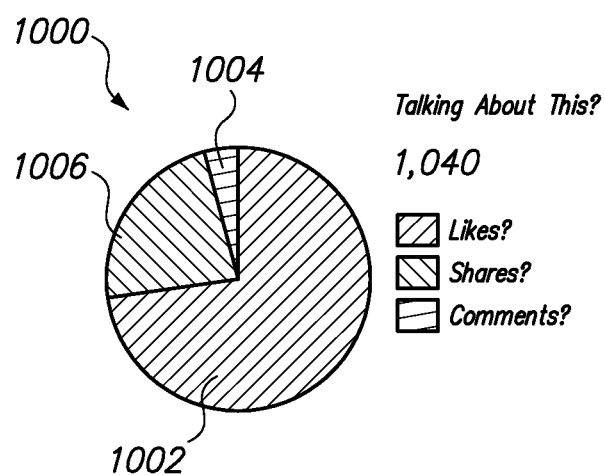
FIG. 10 is an example of a graph illustrating measurement of stories about a post in accordance with one embodiment.

Referring to FIG. 10, in one embodiment, selecting an item in the talking about this 630 column causes a graph such as pie chart 1000 to be displayed. Pie chart 1000 indicates the different types of stories generated by the post. Note that these items collectively make up the portion 904 of graph 900, reflecting the "stories generated" element of user engagement. Stories may be generated by users liking the post (segment 1002), users commenting on the post (segment 1004), or through users sharing the post (segment 1006). In addition, users may also generate stories by responding (RSVP'ing) to a posted event or answering a posted question.

In addition to tracking and reporting on viewership of specific posts, insights module 110 also displays characteristics of users who express an affinity for the page, and how those users discovered the page.

Referring again to FIG. 6, a control area of page 600 includes interface controls, also known as tabs, for viewing insights information about page likes 634, page reach 636, and people talking about the page 638.

In one embodiment, the page likes tab includes a demographics page, a new likes page, and a like sources page.

Figure 11:
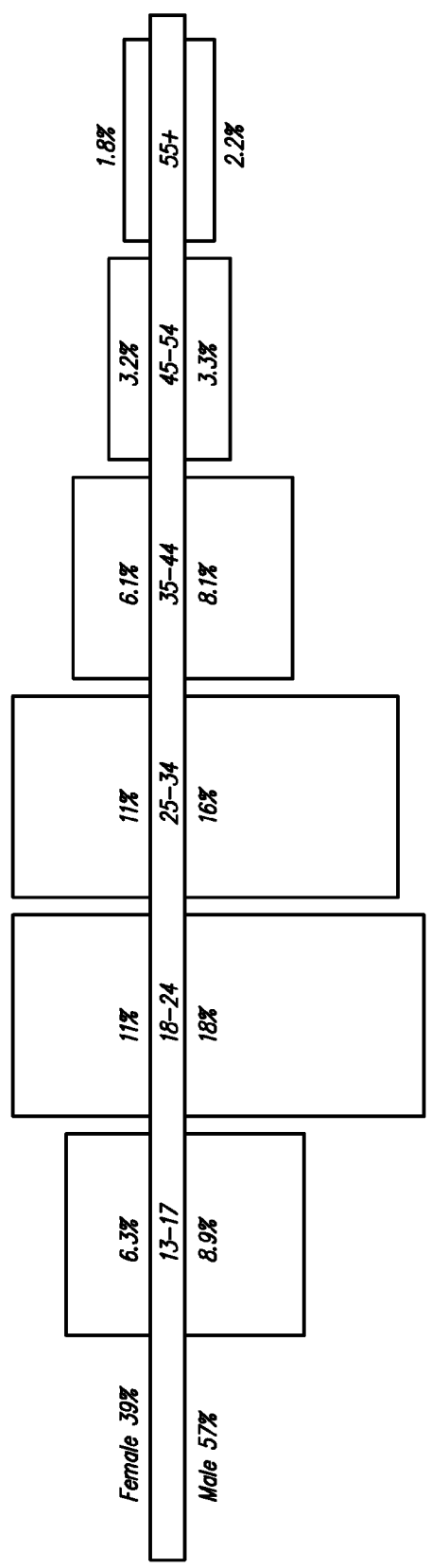
FIG. 11 illustrates demographics information about users interacting with a page in accordance with one embodiment.

FIG. 11 illustrates a demographics page 1100 illustrating information about those users who have liked the page broken down by age and gender, country, city and spoken language. Insights module 110 reads the data for the demographics of page viewers from page activity history 106, and groups the data for display in the example of FIG. 11 according to various age groups, as well as gender, country, city and language spoken. In one embodiment, insights module 110 displays only the countries and cities having more than a minimum percentage of likes in order to prevent the user interface from becoming cluttered.

Figure 12:
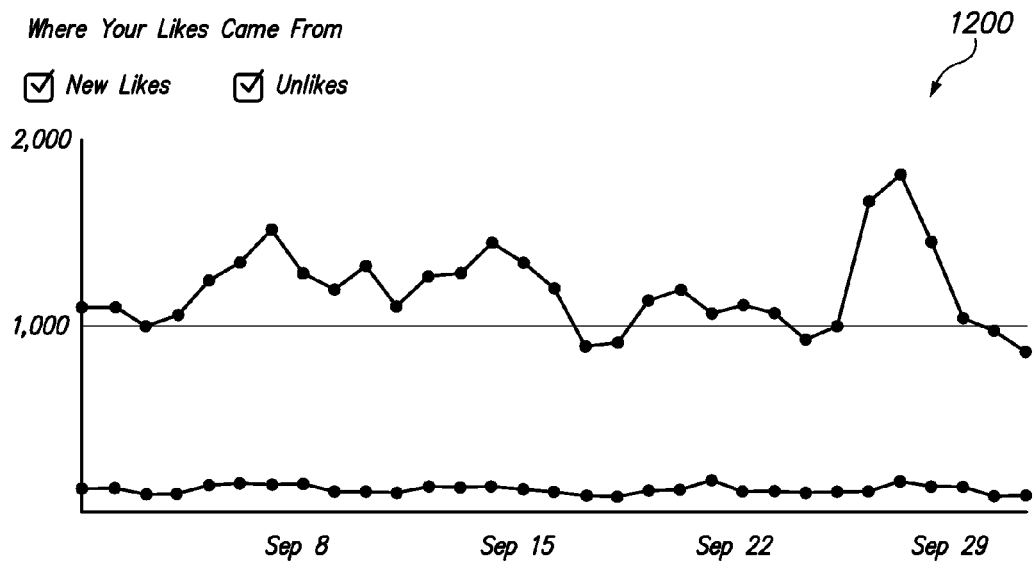
FIG. 12 is an example of a graph illustrating likes and unlikes of a page over time in accordance with one embodiment.

FIG. 12 illustrates a new likes page 1200 of the page likes tab. New likes page 1200 illustrates for the selected time period how many unique people liked the page during each day, and how many unique people have unliked the page (i.e. indicated they no longer like the page) during the same period.

Figure 13:
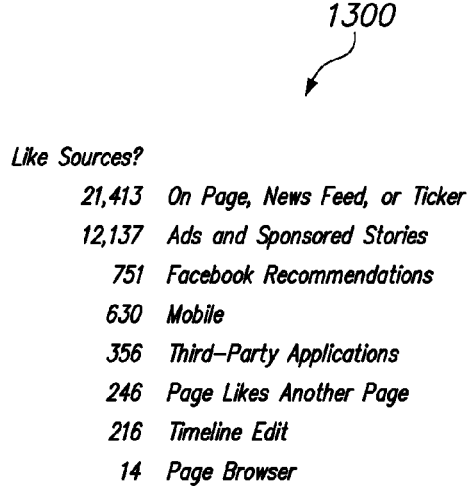
FIG. 13 illustrates an example of like sources for a page in accordance with one embodiment.

FIG. 13 illustrates a like sources page 1300 of the page likes tab. The illustrated like sources indicate the number of times the page was liked, categorized according to where the like occurred, as described above with respected to FIG. 2. In one embodiment, only like sources with non-zero values for that page are shown.

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method, comprising:
   receiving requests from one or more users of a social networking system to interact with a page of the social networking system;
   receiving from one or more users of the social networking system a post within the social networking system about the page;
   receiving requests from one or more users of the social networking system to view one or more of a plurality of posts associated with the page;
   receiving requests from one or more users of the social networking system to interact with one or more of the plurality of posts;
   receiving a request from an administrator of the page for analytical information about the page;
   sending information to display to the administrator in a first region of a user interface:
      a number of times users of the social networking system requested to interact with the page; and
      a number of times users of the social networking system requested to create a post about the page;
   sending information to display to the administrator in a second region of the user interface, for each of the plurality of posts:
      a number of times users of the social networking system requested to view the post; and
      a number of times users of the social networking system requested to interact with the post.

2. The method of claim 1, wherein requesting to interact with the page comprises requesting to express affinity for the page.

3. The method of claim 1, wherein requesting to interact with one or more of the plurality of posts comprises requesting to express affinity for the one or more posts.

4. The method of claim 1, wherein a set of users of the social networking system have interacted with the page, and the first region of the user interface includes a number of connections that the set of users have within the social networking system.

5. The method of claim 1, wherein the first region of the user interface includes a number of users of the social networking system that viewed content associated with the page.

6. The method of claim 1, further comprising:
   responsive to receiving a request for an additional user interface, sending information to display the additional user interface to the administrator, the additional user interface including demographic information associated with the users that requested to interact with the page.

7. The method of claim 1, wherein for each of the plurality of posts, the second region of the user interface includes a number of unique users of the social networking system that have viewed the post.

8. The method of claim 1, wherein for each of the plurality of posts, the second region of the user interface includes a number of times users of the social networking system requested to create an addition post about the post.

9. The method of claim 1, further comprising:
   responsive to receiving a request for an additional user interface, sending information to display the additional user interface to the administrator, the additional user interface including for each of a plurality of channels, a number of users that viewed one of the plurality of posts through the channel.

10. The method of claim 9 wherein one of the plurality of channels includes paid advertisements.

11. The method of claim 9, wherein one of the plurality of channels includes the page.

12. The method of claim 9, wherein one of the plurality of channels includes posts by users.

13. The method of claim 1, wherein a third region of the user interface includes a graph illustrating posts made on the page over time.

14. The method of claim 1, wherein a third region of the user interface includes a graph illustrating views of content associated with the page over time.

15. A computer program product stored on a non-transitory computer readable storage medium having computer program instructions, the computer program instructions to configure one or more processors to perform operations comprising:
   receiving requests from one or more users of a social networking system to interact with a page of the social networking system;
   receiving from one or more users of the social networking system a post within the social networking system about the page;
   receiving requests from one or more users of the social networking system to view one or more of a plurality of posts associated with the page;
   receiving requests from one or more users of the social networking system to interact with one or more of the plurality of posts;
   receiving a request from an administrator of the page for analytical information about the page;
   sending information to display to the administrator in a first region of a user interface:
      a number of times users of the social networking system requested to interact with the page; and
      a number of times users of the social networking system requested to create a post about the page;
   sending information to display to the administrator in a second region of the user interface for each of the plurality of posts:
      a number of times users of the social networking system requested to view the post; and
      a number of times users of the social networking system requested to interact with the post.

16. The computer program product of claim 15, wherein requesting to interact with the page comprises requesting to express affinity for the page.

17. The computer program product of claim 15, wherein requesting to interact with one or more of the plurality of posts comprises requesting to express affinity for the one or more posts.

18. The computer program product of claim 15, wherein a set of users of the social networking system have interacted with the page, and the first region of the user interface includes a number of connections that the set of users have within the social networking system.

19. The computer program product of claim 15, wherein the first region of the user interface includes a number of users of the social networking system that viewed content associated with the page.

20. The computer program product of claim 15, wherein the computer program instructions further configure the one or more processors to:
   responsive to receiving a request for an additional user interface, sending information to display the additional user interface to the administrator, the additional user interface including demographic information associated with the users that requested to interact with the page.

* * * * *